United States Patent
Cohn et al.

(10) Patent No.: US 6,579,951 B1
(45) Date of Patent: Jun. 17, 2003

(54) CHAIN-EXTENDED OR CROSSLINKED POLYETHYLENE OXIDE/POLYPROPYLENE OXIDE/POLYETHYLENE OXIDE BLOCK POLYMER WITH OPTIONAL POLYESTER BLOCKS

(75) Inventors: Daniel Cohn, Jerusalem (IL); Avraham Levi, Shoam (IL)

(73) Assignee: Life Medical Sciences, Inc., Little Silver, NJ (US)

( * ) Notice: Subject to any disclaimer, the term of this patent is extended or adjusted under 35 U.S.C. 154(b) by 104 days.

(21) Appl. No.: 09/587,983

(22) Filed: Jun. 6, 2000

Related U.S. Application Data

(60) Provisional application No. 60/138,132, filed on Jun. 8, 1999.

(51) Int. Cl.$^7$ ...................... C08G 63/664; C08G 65/08; C08G 65/332
(52) U.S. Cl. ........................................ 525/408; 525/403
(58) Field of Search ................................. 525/403, 408

(56) References Cited

U.S. PATENT DOCUMENTS 5,372,723 A * 12/1994 de Geus et al. ............ 210/639
5,711,958 A * 1/1998 Cohn et al. ................. 424/423

\* cited by examiner

Primary Examiner—Robert E. L. Sellers
(74) Attorney, Agent, or Firm—Henry D. Coleman; Coleman Sudol Sapone P.C.

(57) ABSTRACT

A composition exhibiting reverse thermal gellation properties comprises a block polymer having the structure:

$$\{[A_n(BCB)A_n]\}_m$$

wherein A is a polyester unit, B is a poly(ethylene oxide) unit, C is a poly(propylene oxide unit, E is a chain extender or crosslinking agent unit, n ranges from 0 to 20, and m is greater than 2, said block polymer possessing an EO (ethylene xide):PO (propylene oxide) ratio ranging from about 0.2:1 to about 40:1, said composition having a final viscosity at a final temperature of more than twice the initial viscosity at an initial temperature, said final temperature being at least 10° C. higher than said initial temperature.

16 Claims, No Drawings

CHAIN-EXTENDED OR CROSSLINKED POLYETHYLENE OXIDE/POLYPROPYLENE OXIDE/POLYETHYLENE OXIDE BLOCK POLYMER WITH OPTIONAL POLYESTER BLOCKS

RELATED APPLICATIONS

This application claims priority from U.S. provisional application No. 60/138,132, filed Jun. 8, 1999.

FIELD OF THE INVENTION

The present invention relates to novel polymeric compositions based upon $A_n(BCB)A_n$ polyester/polyether multiblocks. Compositions according to the present invention exhibit unexpectedly exceptional reverse thermal gellation (RTG) properties and in preferred embodiments, relatively low viscosities at approximately room temperature or below and extremely high viscosities at temperatures above room temperature (preferably, at approximately body temperature, i.e., within a temperature range of about 32–40° C., depending upon the species of animal to be treated). Compositions according to the present invention may be used advantageously in applications which make use of their reverse thermal gellation properties. Preferred applications for use of the present compositions include, for example, medical applications which make advantageous use of the inherent composition characteristic of being of relatively low viscosity at room temperature or below and much higher viscosity at elevated temperatures, especially body temperature. Compositions according to the present invention may be non-biodegradable or biodegradable, depending upon the application in which the composition is to be used.

The present compositions are preferably advantageously used, for example, in the reduction or prevention of adhesion formation subsequent to medical procedures such as surgery and as lubricants and sealants. In addition, compositions according to the present invention may be used as coatings and transient barriers in the body, for materials which control the release of bioactive agents in the body (drug delivery applications), for wound and burn dressings and for producing biodegradable and non-biodegradable articles, among numerous others. In addition, compositions according to the present invention may incorporate cells for delivery to sites within the body (cell-containing compositions) and allow for their growth and proliferation or for tissue engineering applications. Compositions according to the present invention may also be used for treating periodontal disease and in general dental applications, including the intragingival delivery of bioactive compounds for the treatment of caries or to reduce plaque.

BACKGROUND OF THE INVENTION

There is a wide variety of polymers which are foreign to the human body and which are used in direct contact with its organs, tissues and fluids. These polymers are known as polymeric biomaterials. There is a continuous search for new, improved polymers to provide enhanced materials which are biocompatible, have good bioabsorbtive/biodegrable properties, appropriate mechanical and physical properties and related structural characteristics which find use in the prescribed applications. Materials which provide superior characteristics as well as flexibility in formulation, manufacture and delivery of the material to a situs in the body are especially desirable.

The term "intelligent polymer" refers to a polymeric system able to develop a "dialog" with its environment, as a result of which it displays large and sharp chemical or physical changes, in response to small chemical or physical stimuli. These polymers are denominated smart, stimuli-responsive or environmentally sensitive polymers. Temperature, pH, ionic strength and electric field are among the most important stimuli, causing phase or shape changes which dramatically affects the optical, mechanical or transport properties of the compositions. A number of molecular mechanisms exist which can cause these sharp transitions and water plays a crucial role in most of them. These include: ionization, ion exchange, release or formation of hydrophobically bound water and helix-coil transition.

The desire to find improved polymeric compositions which can be used for specific medical and dental applications is ever present. A major problem which exists in utilizing known polymeric compositions in a diversity of applications, including medical and dental applications is the ability to deliver polymers to sites within the patient's body or mouth having sufficient viscosities to provide the appropriate physical/mechanical properties consistent with the task to be performed. This an acute problem especially where high viscosity is required because the delivery of the polymeric materials is generally very difficult and their conformability extremely limited.

One approach to solving this problem is that of Hubbell, et al. as described in U.S. Pat. No. 5,410,016. In this reference, the use of polymerizable water soluble macromers containing photopolymerizable end-cap groups such as acrylate groups, is described. In the method of Hubbell, in order to provide high viscosity polymeric materials at a site within a patient's body, Hubbell suggests delivering a lower viscosity mixture of the above-described macromers and then photopolymerizing the macromers in situ within the patient's body to obtain high viscosity gels. This approach suffers from the requirement of having to photopolymerize the macromers after they are placed in the body. Inasmuch as consistency, uniformability, (or homogeneity and reproducibility) of UV polymerization is often difficult to achieve even in a factory setting, the difficulties of providing consistent UV polymerization on a case-by-case basis is one major disadvantage of the system. In addition, providing conditions to facilitate photopolymerization in a patient's body is costly, requiring significant expenditures for photopolymerization equipment as well as high costs for calibrating and servicing the equipment. Moreover, using an intense UV energy source at the site of polymerization is difficult and often dangerous to the patient. The use of prepolymerized polymers represents a clear advantage over the Hubbell process.

One of the most important stimuli for influencing polymeric biomaterials is temperature. There are numerous biomedical applications where a sharp increase in viscosity within a narrow and clinically relevant temperature interval is a crucial feature. The phase transition temperature for these polymers is called the Lower Critical Solution Temperature (LCST). Since the transition is endothermic, the process is driven by the entropy gain, resulting from the release of water molecules bound to the hydrophobic groups in the polymer backbone. A feature common to the polymers exhibiting this behavior is the balance between hydrophilic and hydrophobic moieties in the molecules.

The development of temperature-responsive polymers has attracted much attention in recent years, due to their large clinical potential. The ability to inject, deliver or apply a low viscosity liquid which, upon contact with the tissue dramatically increases its viscosity is an extremely attractive characteristic. Recently, a number of polymeric system have been studied, with much of the work focusing on poly (ethylene oxide)/poly(propylene oxide)/poly(ethylene oxide) triblocks, because of their clinical potential. Despite their potential, these materials have failed to be used in the clinic because of inherent performance limitations. A critical inadequacy of these materials is that their viscosity at physiological temperatures is insufficient to provide adequate structure for useful biological activity. Insufficient viscosity affects the cohesiveness and mechanical properties of the material, which negatively impacts their physical stability and significantly reduces their residence time at the implantation site or site of activity. This fundamental limitation affects important properties, thus rendering these polymeric systems unsuitable. In addition, these materials release bioactive agents too quickly to be of clinical relevance.

One additional attrribute of many biomaterials is that the biodegradable/bioabsorbable. Early biodegradable/bioabsorbable polymers focused on polylactic and/or polyglycolic acid homopolymers or copolymers which were used primarily in bioabsorbable sutures. These early polymers suffered from the disadvantage that the polymers tended to be hard or stiff and often brittle with little flexibility. In addition, the kinetics of their degradation tended to be slow in certain applications, necessitating research on polymers with faster degradation profiles.

A number of other copolymers utilizing lactic acid, glycolic acid, E-caprolactone, poly(orthoesters) and poly (orthocarbonates), poly(esteramides) and related polymers have been synthesized and utilized in medical applications with some measure of success. The polymers tend to be limited, however, by disadvantages which appear in one or more of the following characteristics: flexibility, strength, extensibility, hardness/softness, biocompatability, biodegradability, sterilizability, ease of formulation over a wide range of applications and tissue reactivity.

Recent investigative attention has centered on the production of polymeric compositions comprising polyester triblocks which are derived from blocks of poly(oxy) alkylene and polyhydroxycarboxylic acids. These formulations, among others, have exhibited favorable characteristics for use to reduce and/or prevent adhesion formulation secondary to surgery and other medical applications.

Despite the advances that the aforementioned polymeric compositions represent in the field of treating adhesions, with the advance of less invasive surgical techniques, work continues to find methods and compositions which are more easily delivered to sites in the body which have been surgically repaired using the newer surgical techniques. In particular, laparascopic surgical methods are now being used with increasing frequency. These methods produce favorable surgical results while significantly limiting the opening through which the surgery is performed. The limited openings result in increased difficulty to deliver anti-adhesion and related polymers, especially those of high viscosity or which are film-like, which may be advantageously used in a number of applications.

OBJECTS OF THE INVENTION

It is an object of the present invention to provide novel polymeric materials exhibiting reverse thermal gellation properties which may be used in a variety of medical, biological, cosmetic, environmental, mechanical and other applications.

It is an additional object of the invention to provide polymeric materials which may be manufactured and delivered to a site in a patient's body in liquid or low viscosity form at temperatures below body temperature (preferably at or below ambient temperature) which significantly increase in viscosity when delivered to a site at elevated temperature (above ambient temperature and preferably body temperature).

It is an additional object of the invention to provide compositions which may be delivered at room temperature in the form of low viscosity polymeric compositions, but which significantly increase in viscosity after being exposed to elevated temperatures.

It is yet another object of the invention to provide polymeric materials which may be used to substantially prevent adhesions and which may be effective for delivering bioactive agents, cells and other biological material to sites in patient's body.

It is yet an additional object of the invention to provide polymeric materials which can be produced in a variety of formulations which, when exposed to elevated temperatures, result in polymeric materials having acceptable strength and mechanical properties and exhibit reactivity or non-reactivity with patient tissue depending upon the desired application.

These and/or other objects of the invention may be readily gleaned from the detailed description of the present invention including any one or more of the embodiments which are described hereinbelow.

BRIEF DESCRIPTION OF THE INVENTION

The present invention relates to novel polymeric compositions based upon $\{[A_n(BCB)A_n]E\}_m$ repeating units. In the present compositions A is a polymer preferably comprising aliphatic ester units (polyester), B is a poly(ethylene oxide) group, C is a poly (propylene oxide) group, E is a chain extender or crosslinking agent, n is an integer ranging from 0 to 50, preferably 1 to 20 (0 to 20 in the case of non-biodegradable materials), even more preferably 2 to 16 (0 to 16 in the case of non-biodegradable materials) and m is the number of times the triblock (where n is 0) or pentablock (where n is 1 or more) and m is the number of repeating units in the polymer molecule and is an integer equal to or greater than 2 (within practical limits, up to about 100,000 or more), preferably ranging from about 2 to about 500, more preferably about 3 to 100. Thus, where n is 0, the present invention contemplates polymers of the structure $\{(BCB)E\}_m$.

In the present invention, A blocks are preferably derived from hydroxy acid units or their cyclic dimers and the like, even more preferably α-hydroxy acid units or their cyclic dimers and the like, such as a related ester or lactone. Preferably the A block comprises α-hydroxyacid units derived from an aliphatic α-hydroxy carboxylic acid or a related acid, ester or similar compound such as, for example, lactic acid, lactide, glycolic acid, glycolide, or a related aliphatic hydroxycarboxylic acid or ester (lactone) such as, for example, β-propiolactone, ε-caprolactone, δ-glutarolactone, δ-valerolactone, β-butyrolactone, pivalolactone, α,α-diethylpropiolactone, ethylene carbonate, trimethylene carbonate, γ-butyrolactone, p-dioxanone, 1,4-dioxepan-2-one, 3-methyl-1,4-dioxane-2,5-dione, 3,3,-dimethyl-1-4-dioxane-2,5-dione, cyclic esters of α-hydroxybutyric acid, α-hydroxyvaleric acid, α-hydroxyisovaleric acid, α-hydroxycaproic acid, α-hydroxy-α-ethylbutyric acid, α-hydroxyisocaproic acid, α-hydroxy-α-methyl valeric acid, α-hydroxyheptanoic acid, α-hydroxystearic acid, α-hydroxylignoceric acid, salicylic acid and mixtures, thereof.

The use of α-hydroxyacids in the present invention is preferred. The A block of the pentablocks of the present invention preferably comprises a poly(α-hydroxycarboxylic acid), for example, poly(glycolic acid), poly(L-lactic acid), poly(D,L-lactic acid) and polycaprolactone, because these polymers will degrade and produce monomeric units which may be metabolized by the patient.

The B block in the pentablock compositions according to the present invention is preferably a (poly)ethylene oxide polymer ranging in size from about 10 ethylene oxide units to about 500 ethylene oxide units, more preferably, about 25 to about 150 ethylene oxide units, even more preferably about 60 to about 125 ethylene oxide units. The molecular weight of the (poly)ethylene oxide B block generally ranges in size from about 440 to about 22,000 atomic mass units and will reflect the number of monomeric units which are contained within the B block.

The C block is a (poly)propylene oxide polymer which ranges in size from about 10 monomeric units to about 500 monomeric units, more preferably about 20 monomeric units to about 150 monomeric units, even more preferably about 25 monomeric units to about 100 monomeric units.

${[A_n(BCB)A_n]E}_m$ multiblock polymers according to the present invention are characterized by their reverse thermal gellation properties, i.e., their ability to be readily delivered to sites within a patient's body at relatively low initial viscosity (preferably at less than about 5,000 cps, even more preferably about 1,000 cps units) at about ambient temperatures or less (i.e., at less than about 30° C., more preferably at less than about 23–25° C.) and their ability to gel or substantially increase viscosity from the initial viscosity at elevated temperatures of at least about 30° C., more preferably at about body temperature or higher (i.e., at least about 34–38° C.) such that the final viscosity in centipoise units of the polymer at elevated temperature is at least two times the initial viscosity of the polymer. In preferred aspects according to the present invention, the final viscosity in centipoise units of the polymer is at least about four times the viscosity, more preferably at least about ten times the initial viscosity in centipoise units of the delivered polymer. In certain embodiments, the final viscosity may be more than 100-fold greater and in other embodiments more than a 1,000-fold greater than the intitial viscosity. In certain preferred aspects according to the present invention, the final viscosity may be more than $10^6$-fold greater than the initial viscosity. Polymeric compositions according to the present invention may also be characterized by their enhanced cohesiveness and mechanical properties, their superior physical stability and extended residence time at the implantation site and improved transport characteristics which produces slower, more controllable and reproducible release of bioactive agents from the polymeric matrix. All of these characteristics represent a fundamental improvement compared to polymers based upon poly(ethylene oxide)/poly(propylene oxide)/poly(ethylene oxide) triblocks.

DETAILED DESCRIPTION OF THE INVENTION

The following terms shall be used in describing the present invention:

The term "patient" is used to describe an animal, including a mammal and preferably, a human, in need of treatment with compositions according to the present invention.

The term "viscosity" is used to describe an important characteristic of polymeric compositions according to the present invention. Viscosity is a property or quality of compositions according to the present invention which relates to the resistance of the composition to flow. For purposes of the present invention, viscosity is measured in centipoise units as determined by a Brookfield Programmable Viscometer using the required DV-II+spindle at 0.5 rpm. Compositions according to the present invention which have lower viscosities, i.e., viscosities which are less than about 1,000 centipoise (cps) units tend to be flowable. As the viscosity of the compostions decreases, the flowability of the composition increases. Compositions according to the present invention which have viscosities which are less than about 10,000 cps generally are flowable and deliverable to most sites within a patient's body. Compositions which have viscosities which are less than about 1,000 cps are readily flowable and deliverable in nature, whereas those compositions which have viscosities which are greater than about 1,000 cps tend to be less flowable and less deliverable. It is noted that compositions which have viscosities as high as 700,000 cps or more are deliverable through a syringe with an 18G needle and here, we are referring to flow and deliverability per se, i.e., not under pressure.

The term "initial viscosity" is used to describe the viscosity of polymeric compositions which are delivered at an "initial temperature", preferably at ambient temperatures or below (i.e., at a temperature of about 20–25° C. or less) to sites within a patient's body. The term "final viscosity" is used to describe compositions which have been delivered to a site in the patient's body or other site and have been exposed to a "final temperature", i.e., a temperature which is elevated or higher (generally, at least about 10° C. higher) than the initial temperature. Initial viscosities and final viscosities as used in the present invention are taken after a composition has been subjected to an initial temperature or a final temperature, respectively, for a period sufficient to establish a constant viscosity reading. As a general rule, depending upon the size of the polymeric sample to be tested, establishing a constant viscosity will usually occur on a consistent basis after approximately 30 minutes or more at constant temperature.

Although the initial temperature and final temperature may vary broadly over a wide range from a temperature approaching 0° C. to temperatures of 100° C. or more, preferably the initial temperature is approximately ambient temperature and the final temperature is at least about 10° C. higher than ambient temperature. More preferably, the initial temperature is no greater than about 30° C., and in the most preferred case, approximately room temperature (20–25° C.). The final temperature is at least about 10° C. above the initial temperature, and may be considerably above the body temperature of the patient). In preferred embodiments according to the present invention which relate to the use of the present compositions in medical applications, the initial temperature is generally no greater than about room temperature (i.e., about 20–23° C.) and the final temperature is approximately physiological temperature (depending upon the animal to be treated, such temperatures ranging from about 32–40° C.).

The initial viscosities of compositions of the present invention fall within a range which allows delivery of the polymeric composition to a site to be treated or to where the polymeric composition is to be used. Initial viscosities which are consistent with the delivery of the present compositions to sites within the patient's body may range from about 100 cps to about 10,000 cps or even higher (e.g. 20,000–30,000), preferably about 250 cps to about 5000 cps, more preferably about 250 cps to about 2000 cps. Obviously, the lower the viscosity, the more readily deliverable is the polymer. This characteristic of "deliverability" at the initial viscosity must be weighed against the final viscosity of the polymeric composition, in order to obtain an appropriate balance. Also, other considerations, including the geometry of the site will play a role in determining the level of the initial viscosity.

Final viscosities of compositions according to the present invention generally range from about 2500 cps to well over 20,000,000 cps, with preferred viscosities depending upon the purpose for which a polymer is to be used. Preferred compositions generally will have viscosities which are higher in order to maximize the inteded effect of the polymer. In the case of treating adhesions or providing structural devices in the patient's body such as barriers, cellular supports and the like, a higher final viscosity may be preferred in order to obtain the desired mechanical properties. In the case of delivering bioactive agents or biological material including cells, the final viscosity used may be less than in other instances.

For purposes of defining the present invention, initial viscosities and final viscosities are determined on a Brookfield Programmable Viscometer using the DV-II+spindle at 0.5 rpm after allowing the composition to set for a period of at least 30 minutes. Noted here is the fact that viscosities of certain compositions according to the present invention may be so large (substantially in excess of 100,000 cps and in certain cases more than 20,000,000 cps) that measurement is inexact and viscosities are simply estimated.

The term "polymer" is used to describe high molecular weight compositions according to the present invention which comprise two or more chain-extended BCB triblocks and are based upon $\{[A_n(BCB)A_n]E\}_m$ multiblocks as previously defined. Polymers according to the present invention may range in molecular weight (average molecular weight) from several hundred to several million or more and as described, may include oligomers of relatively low molecular weight. Preferred compositions according to the present invention have molecular weights ranging from about 10,000 to about 100,000, more preferably about 15,000 to about 60,000.

The terms "poly(ethlyene glycol)", "PEG", poly(ethylene oxide), "PEO" and "EO" are used interchangably to describe the present invention. These polymers, of varying weights, are used in the B block of $\{[A_n(BCB)A_n]E\}_m$ multiblocks, where m is the number of repeating units in the polymer molecule. Poly(ethylene oxide) oligomers may also be used in chain extenders and crosslinking agents according to the present invention.

The terms "poly(propylene glycol)", "PPG", poly (propylene oxide) and "PO" are used interchangably to describe the present invention. These polymers, of varying weights, are used in the C block of $\{[A_n(BCB)A_n]E\}_m$ multiblocks, where m is the number of repeating units in the polymer molecule. Poly(propylene glycol) oligomers may also be used in chain extenders and crosslinking agents according to the present invention.

The term "polyester" is used to describe polyester A blocks of the $\{[A_n(BCB)A_n]E\}_m$ multiblocks used in polymeric compositions according to the present invention where A is a polymeric polyester unit which may be derived from an aliphatic hydroxy carboxylic acid or a related ester, lactone, dimeric ester, carbonate, anhydride, dioxanone or related monomer and is preferably derived from an aliphatic α-hydroxy carboxylic acid or related ester, such units derived from the following: including, for example, lactic acid, lactide, glycolic acid, glycolide, or a related aliphatic hydroxycarboxylic acid, ester (lactone), dimeric acid or related compound such as, for example, β-propiolactone, ε-caprolactone, δ-glutarolactone, δ-valerolactone, β-butyrolactone, pivalolactone, α,α-diethylpropiolactone, ethylene carbonate, trimethylene carbonate, γ-butyrolactone, p-dioxanone, 1,4-dioxepan-2-one, 3-methyl-1,4-dioxane-2,5-dione, 3,3,-dimethyl-1-4-dioxane-2,5-dione, cyclic esters of α-hydroxybutyric acid, α-hydroxyvaleric acid, α-hydroxyisovaleric acid, α-hydroxycaproic acid, α-hydroxy-α-ethylbutyric acid, α-hydroxyisocaproic acid, α-hydroxy-α-methyl valeric acid, α-hydroxyheptanoic acid, α-hydroxystearic acid, α-hydroxylignoceric acid, salicylic acid and mixtures, thereof. The use of α-hydroxyacids and their corresponding cylic dimeric esters, especially lactide, glycolide and caprolactone in the present invention, is preferred. It is noted that in using certain of the described monomers according to the present invention, the monomeric units which are produced are not specifically ester groups, but may include such groups as carbonate groups (polycarbonates), amino acids (which produce polyamides) and related groups which are derived from the above-described monomers or which contain a nucleophilic group and an electrophilic group and can be polymerized. It will be understood that the term polyester shall encompass polymers which are derived from all of the above monomers, with those which actually produce ester units being preferred.

The terms "poly(hydroxy carboxylic acid)" or "poly(α-hydroxy carboxylic acid)" are terms used to describe certain polyester A blocks of $\{[A_n(BCB)A_n]E\}_m$ multiblocks used in polymeric compositions according to the present invention where A is a polymeric polyester unit derived from an aliphatic hydroxy carboxylic acid or a related ester or dimeric ester and is preferably derived from an aliphatic α-hydroxy carboxylic acid or related ester, including a cyclic dimeric ester, such as, for example, lactic acid, lactide, glycolic acid, glycolide, or a related aliphatic hydroxycarboxylic acid or ester (lactone) such as, for example, ε-caprolactone, δ-glutarolactone, δ-valerolactone, γ-butyrolactone and mixtures, thereof, among numerous others as set forth herein. The use of α-hydroxyacids and their corresponding cylic dimeric esters, especially lactide and glycolide in the present invention, is preferred.

The term "multiblock" is used to describe polymers according to the present invention which comprise a first polyester A block covalently linked to a poly(ethylene oxide) B block as described above, which is, in turn, covalently linked to a poly(propylene oxide) C block which is, in turn, linked to a poly(ethylene oxide) B block which is linked again to a polyester A block and is further reacted with a chain-extender or crosslinking agent to provide an E block.

The term "pentablock" refers to $A_n(BCB)A_n$ molecules according to the present invention which have not been chain extended or crosslinked to produce $\{[A_n(BCB)A_n]E\}_m$ polymeric compositions. Pentablocks according to the present invention may be terminated by hydroxyl or amine moieties (from polyamides including polymeric amino acids), but in preferred embodiments, are terminated with hydroxyl groups which can be readily covalently linked to chain extenders, crosslinking agents or other groups which contain electrophilic moieties, to produce the final polymers which are used in the present invention.

The term "EO/PO" ratio is used to describe the ratio of ethylene oxide units to propylene oxide units in a given BCB triblock. It is this ratio, in combination with the extent of polymerization which is important in determining the extent of viscosity change which occurs from an initial temperature of delivery to a final temperataure. It is also this ratio and the value of m which primarily determines the degree and extent of reverse thermal gellation properties. The EO/PO ratio of the BCB triblocks used in the pentablock polymeric compositions according to the present invention will range generally from about 40:1 (40.0) to about 1:5 (0.2), with a preferred ratio falling within the range of about 7.5:1 (7.5) to about 1:1 (1.0), more preferably about 5:1 (5.0) to about 1:1 (1.0). In defining the EO/PO ratio, it is the number of monomeric units of ethylene oxide in a BCB triblock which are compared to the number of monomeric units of PPG in the triblock which provide the EO/PO ratio. It is noted here that in certain instances, where oligomeric ethylene oxide or propylene oxide units are part of the molecules used to chain extend or crosslink a pentablock $A_n(BCB)A_n$ molecule, the amount of ethylene oxide or propylene oxide may influence the RTG characteristics of the polymeric composition and may reflect the contribution from the ethylene oxide or propylene oxide units which may be found in blocks other than the BCB triblocks.

The term "BCB triblocks" is used to describe triblocks according to the present invention which comprise a triblock of poly(ethylene oxide)/poly(propylene oxide)/poly(ethylene oxide) blocks.

The term "adhesion" is used to describe abnormal attachments between tissues or organs or between tissues and implants (prosthetic devices) which form after an inflammatory stimulus, most commonly surgery, and in most instances produce considerable pain and discomfort. When adhesions affect normal tissue function, they are considered a complication of surgery. These tissue linkages often occur between two surfaces of tissue during the initial phases of post-operative repair or part of the healing process. Adhesions are fibrous structures that connect tissues or organs which are not normally joined. Common post-operative adhesions to which the present invention is directed include, for example, intraperitoneal or intraabdominal adhesions and pelvic adhesions. The term adhesion is also used with reference to all types of surgery including, for example, musculoskeletal surgery, abdominal surgery, gynecological surgery, ophthalmic, orthopedic, central nervous system and cardiovascular repair. Adhesions may produce bowel obstruction or intestinal loops following abdominal surgery, infertility following gynecological surgery as a result of adhesions forming between pelvic structures, restricted limb motion (tendon adhesions) following musculoskeletal surgery, cardiovascular complications including prolonging the operative time at subsequent cardiac surgery, an increase in intracranial bleeding, infection and cerebrospinal fluid leakage and pain following many surgeries, especially including spinal surgery which produces low back pain, leg pain and sphincter disturbance.

The term "tissue engineering" is used to describe the use of the present compositions in applications which relate to biological substitutes to restore, maintain or improve tissue functions. The field of tissue engineering merges the fields of cell biology, engineering, materials science and surgery, to fabricate new functional tissue using living cells and a matrix or scaffolding which can be natural, synthetic or combinations of both. Matrices, provided from compositions according to the present invention, are utilized to deliver cells to desired sites in th body, to define the potential space for engineered tissue and to guide the process of tissue development. Direct injection of a cell suspension without matrices has been utilized in some cases, but it is difficult to control the placement of transplanted cells. A majority of mammalian cell types are anchorage dependent and will die if not provided an adhesion substrate. Compositions according to the present invention can be used in tissue engineering applications, in certain applications, by functioning as an adhesion substrate, anchoring cells to be transplanted in a patient to allow survival, growth and ultimately, grafting and or anchoring of the transplanted cells to normal cellular tissue.

The term "bioactive agent" is used throughout the specification to describe biological active agents which may be delivered to a patient to produce a biological or pharmacological result. Exemplary bioactive agents which may be delivered pursuant to the to the present invention include, for example, angiogenic factors, growth factors, hormones, anticoagulants, for example heparin and chondroitin sulphate, fibrinolytics such as tPA, plasmin, streptokinase, urokinase and elastase, steroidal and non-steroidal anti-inflammatory agents such as hydrocortisone, dexamethasone, prednisolone, methylprednisolone, promethazine, aspirin, ibuprofen, indomethacin, ketoralac, meclofenamate, tolmetin, calcium channel blockers such as diltiazem, nifedipine, verapamil, antioxidants such as ascorbic acid, carotenes and alpha-tocopherol, allopurinol, trimetazidine, antibiotics, including noxythiolin and other antibiotics to prevent infection, prokinetic agents to promote bowel motility, agents to prevent collagen crosslinking such as cis-hydroxyproline and D-penicillamine, and agents which prevent mast cell degranulation such as disodium chromoglycate, among numerous others.

In addition to the above agents, which generally exhibit favorable pharmacological activity related to promoting wound healing, reducing infection or otherwise reducing the likelihood that an adhesion will occur, other bioactive agents may be delivered by the polymers of the present invention include, for example, amino acids, peptides, proteins, including enzymes, hormones, growth factors, carbohydrates, antibiotics (treat a specific microbial infection), anti-cancer agents, neurotransmitters, hormones, immunological agents including antibodies, nucleic acids including antisense agents, fertility drugs, psychoactive drugs and local anesthetics, among numerous additional agents.

The delivery of these agents will depend upon the pharmacological activity of the agent, the site of activity within the body and the physicochemical characteristics of the agent to be delivered , the therapeutic index of the agent, among other factors. One of ordinary skill in the art will be able to readily adjust the physicochemical characteristics of the present polymers and the hydrophobicity/hydrophilicity of the agent to be delivered in order to produce the intended effect. In this aspect of the invention, bioactive agents are administered in concentrations or amounts which are effective to produce an intended result. It is noted that the chemistry of polymeric composition according to the present invention can be modified to accommodate a broad range of hydrophilic and hydrophobic bioactive agents and their delivery to sites in the patient.

The term "biological material" is used throughout the present invention to describe cells, tissue and other material of a biological nature which may be used to treat a patient using the polymeric compositions according to the present invention. Thus, biological material which may be delivered using the present compositions includes, for example, stems cells, marrow cells, bone cells, hepatocytes, keratinocytes, chondrocytes, osteocytes, endothelial cells, smooth muscle cells, transplants including transplanted organs, tissues and other cellular material.

The term "chain extender" is used throughout the specification to describe compounds which are used to link BCB triblocks or $A_n(BCB)A_n$ pentablocks according to the present invention. In order to increase the molecular weight of the polymer produced, the BCB triblock or $A_n(BCB)A_n$ pentablock is chain-extended using difunctional compounds such as diisocyanates, dicarboxylic acid compounds or derivatives of dicarboxylic acids such as diacyl halides. The product which is formed from the reaction of the chain extender with the BCB triblock or $A_n(BCB)A_n$ pentablocks according to the present invention will depend upon the chemical nature of the nucleophilic (or electrophilic) moieties on the $A_n(BCB)A_n$ pentablock and the electrophilic (or nucleophilic) moieties on the chain extender. The reaction products can vary widely to produce different moieties, such as urethane groups and ester groups, among numerous others. The product is generally represented as a $\{[A_n(BCB)A_n]E\}_m$ polymer. Preferably, the nucleophilic BCB triblocks or $A_n(BCB)A_n$ pentablocks are chain-extended with diisocyanate compounds in order to produce chain-extended polymers according to the present invention, although the chemical approaches may vary considerably.

The term "crosslinking agent" is used throughout the specification to describe chain extenders which have at least three functional or reactive groups, so that the triblocks and pentablocks according to the present invention may be chain-extended and crosslinked, providing a more dense and rigid three dimensional structure to polymers according to the present invention.

RTG polymers according to the present invention may be described by the following formula:

$$\frac{BCB}{(E) + 2(A_n)}.$$

Where E is a chain extender (or crosslinking agent) and A is a biodegradable component, preferably a biodegradable ester unit of a polyester and the BCB triblock comprises a PEG block, a PPG block and PEG block. In the present invention, n may range from 0 (the polymer is non-biodegradable) to 16 ester units (the number of A units is $2A_n$ or 32). The molar ratio of the BCB unit to chain extender or crosslinking unit is generally about 1:1. The molecular weight of the BCB triblock in compositions according to the present invention may range from about 1,000 to about 25,000 (in Dalton Units) or more, with a preferred molecular weight of about 4,500 to about 16,000. In BCB triblocks according to the present invention, the weight % of PEG ranges from about 13% to about 97% by weight, preferably about 40% to about 80% by weight, with the PPG making up the remaining weight of the triblock.

Synthesis of Polymers According to the Present Invention

In producing $A_n(BCB)A_n$ pentablocks according to the present invention, a BCB triblock is a hydroxyacid, cyclic dimer or a related monomer as otherwise described herein to produce a pentameric $A_n(BCB)A_n$ pentablock. Once the pentamer is formed, it is reacted with a chain-extender, E, to produce a chain-extended $A_n(BCB)A_n$ pentablock of structure $\{[A_n(BCB)A_n]E\}_m$. Alternatively, the pentameric polymer may be reacted with crosslinking agent to produce a crosslinked polymeric system.

A particularly preferred synthesis of the polyester A block according to the present invention relies on the use of the cyclic ester or lactone of lactic acid, glycolic acid or caprolactone. The use of lactide, glycolide or caprolactone as the reactant will enhance the production of $A_n$ blocks which have relatively narrow molecular weight distributions (low polydispersity).

In this preferred method, lactide, glycolide or caprolactone (the cyclic lactone, rather than the linear hydroxyacid), is used to synthesize the $A_n(BCB)A_n$ pentablock. Once the pentablock is obtained, it is preferably reacted with a diisocyanate, preferably hexamethylene diisocyanate to chain-extend the polymer.

The synthesis of the pentablock $A_n(BCB)A_n$ preferably proceeds by way of a ring-opening mechanism, whereby the ring opening of the lactide, glycolide or caproclactone is initiated by the hydroxyl end groups of the BCB chain under the influence of a catalyst such as stannous octoate. An $A_n(BCB)A_n$ type pentablock is generated at this point, the molecular weight of which is a function of both the molecular weight of the central BCB pluronic block, and the length of the polyester, preferably PLA, PGA or PCL lateral block(s). Typically, the molecular weight of the pentablock ranges from about 5,000 to about 50,000 (but may be as low as 1,500 or less and as high as 100,000 or more). After synthesis of the $A_n(BCB)A_n$ pentablock, the final polymer is preferably obtained by chain extending the hydroxyl terminated triblocks with difunctional reactants such as isocyanates, most preferably, hexamethylene diisocyanate.

The chemical and physical properties of the different polymers will vary as a function of different parameters, the molecular weight and composition of the BCB triblock, the A segments, and most importantly, the value of m of in the $\{[A_n(BCB)A_n]E\}_m$ polymeric compositions according to the present invention.

Having generally described the invention, reference is now made to the following examples intended to illustrate preferred embodiments and comparisons but which are not to be construed as limiting to the scope of this invention as more broadly set forth above and in the appended claims.

EXAMPLES

The synthesis of the polymers is presented in the following examples. In general, where solvent is used, it is dried and distilled prior to use. Nitrogen is used dry at all times. All other materials are dried and distilled prior to use. Pluronic F-127, is available from Sigma or BASF.

Example 1

Synthesis of $[((1)-LA)_2-F\ 127-((1)-LA)]_2$ 40 grams Pluronic F-127 (molecular weight 12,600) were dried under vacuum at 90° C. for 1.5 hr. in an Erlenmeyer flask, 1.6 gram (1)-Lactide and 0.18 gram catalyst (stannous 2-ethyl hexanoate) (0.43%) were added to Pluronic F-127. The reaction was carried out in a sealed flask, under a dry nitrogen saturated atmosphere, for two and half hours at 145° C.

The product is a water soluble white, brittle solid, at room temperature. The DSC analysis showed a Tg around −60° C. and a melting endotherm at 57° C.

Example 2

Synthesis of Poly[(1)-LA)$_2$-F 127-(1)-LA)$_2$-HDI]

32.1 grams $((1)-LA)_2$-F127-$((1)-LA)_2$ obtained in Example 1 were dried in a three-necked flask under vacuum at 90° C. for 1.5 hr. 0.42 gram Hexamethylene diisocyanate (HDI) and 0.20 gram catalyst (stannous 2-ethyl hexanoate) (0.61%) were reacted with ((1)-LA)$_2$-F127-((1)-LA)$_2$ for 15 minutes, under mechanical stirring (160 rpm) and dry nitrogen atmosphere, at 80° C.

The product is a water soluble white brittle solid, at room temperature. The DSC analysis showed a Tg around −60° C. and a melting endotherm at 55° C.

Example 3

Synthesis of ((1)-LA)$_4$-F127-((1)-LA)$_4$ 40.0 gr. Pluronic F-127 were dried under vacuum at 90° C. for 1.5 hr. And then, 3.14 grams (1)-Lactide and 0.18 gram catalyst (stannous 2-ethyl hexanoate ) (0.45%) were added the dry F-127. The reaction was carried out in a sealed flask, under a dry nitrogen saturated atmosphere, for two and half hours at 145° C.

The product is a water soluble, brittle solid, at room temperature. The DSC analysis showed a Tg around −59° C. and a melting endotherm at 51° C.

Example 4

Synthesis of Poly [((1)-LA)$_4$-F127-((1)-LA)$_4$-HDI]

35.0 grams of the ((1)-LA)$_4$-F-127-((1)-(LA)$_4$ obtained in Example 3 were dried in a three-necked flask under vacuum at 90° C. for 1.5 hr. 0.45 gram Hexamethylene diisocyanate (HDI) and 0.11 gram catalyst (stannous 2-ethyl hexanoate) (0.31%) were added to ((1)-LA)$_4$-F 127-((1)-LA)$_4$, and reacted for 15 minutes, under mechanical stirring (160 rpm) and dry nitrogen atmosphere, at 80° C.

The product is a water soluble, brittle solid, at room temperature. The DSC analysis showed a Tg around −59° C. and a melting endotherm at 49° C.

Example 5

Synthesis of F127-HDI-F127

30.0 gr. of F-127 were dried in a three-necked flask under vacuum at 100° C. for 1.5 hr. 0.20 gram Hexamethylene diisocyanate (HDI) and 0.38 gram catalyst (stannous 2-ethyl hexanoate) (1.2%) were added to F-127, and reacted with the F-127 for 30 minutes under mechanical stirring (160 rpm) and dry nitrogen atmosphere, at 80° C.

The product is a water soluble, brittle solid, at room temperature. The DSC analysis showed a Tg around −60° C. and a melting endotherm at 56° C.

Example 6

Synthesis of ((1)-LA)$_2$-F127-HDI-F127-((1)-LA)$_2$ 30.6 grams F127-HDI-F127 obtained in Example 5 were mixed with 0.61 gram (1)-Lactide and 0.346 gram catalyst (stannous 2-ethyl hexanoate). The reaction was then carried out in a three-necked flask at 150° C., under mechanical stirring (160 rpm) and dry nitrogen atmosphere.

The product is a water soluble, brittle solid, at room temperature. The DSC analysis showed a Tg around −59° C. and a melting endotherm at 51° C.

Example 7

Synthesis of ((1)-LA)$_4$-F127-HDI-F127-((1)-LA)$_4$ 30.6 grams F127-HDI-F127 obtained in Example 5 were mixed with 1.23 grams (1)-Lactide. 0.346 gram catalyst (stannous 2-ethyl hexanoate) were added to F127-HDI-F127, and the reaction was carried out in a three-necked flask at 150° C., under mechanical stirring (160 rpm) and dry nitrogen atmosphere.

The product is a water soluble, brittle solid, at room temperature. The DSC analysis showed a Tg around −58° C. and a melting endotherm at 56° C.

Example 8

Synthesis of Poly [((1)-LA),-F127-HDI-F127-((1)-LA)$_2$-HDI]

31.1 grams ((1)-LA)$_2$-F127-HDI-F127-((1)-LA)$_2$ obtained in Example 6 were mixed with 0.204 gram Hexamethylene diisocyanate (HDI). Catalyst (stannous 2-ethyl hexanoate) was added at a weight percentage of 0.26% to the reactants.

The reaction was carried out in a three necked flask at 10020 C. under mechanical stirring (160 rpm) and dry nitrogen atmosphere.

The product is a water soluble, brittle solid, at room temperature. The DSC analysis showed a Tg around −57° C. and a melting endotherm at 55° C.

Example 9

Synthesis of Poly [((1)-LA)$_4$-F127-HDI-F127-((1)-LA)$_4$-HDI]

31.1 grams ((1)-LA)$_4$-F127-HDI-F127-((1)-LA)$_4$ obtained in Example 7 were mixed with 0.202 gram Hexamethylene diisocyanate (HDI). Catalyst (stannous 2-ethyl hexanoate) was then added at a weight percentage of 0.26% to the reactants. The reaction was carried out in a three-necked flask at 100° C. under mechanical stirring (160 rpm) and dry nitrogen atmosphere.

The product is a water soluble, brittle solid, at room temperature. The DSC analysis showed a Tg around −59° C. and a melting endotherm at 53° C.

Example 10

Synthesis of Poly [F-127-HDI]

50 grams Pluronic F-127 were dried under vacuum at 90° C. for 1.5 hours in an Erlenmeyer flask. 0.67 grams Hexamethylene diisocyanate (HDI) and 0.160 gram catalyst (stannous 2-ethyl hexanoate) (0.32 wt %) were added to Pluronic F-127 and reacted for 12 hours minutes under mechanic stirring (160 rpm) and dry nitrogen atmosphere, at 80° C.

The product obtained is a water soluble white solid, at room temperature. The DSC analysis showed a Tg of approximately −61° C. and a meltling endotherm at 57° C.

Example 11

Synthesis of Poly [(Cl)-F127-(Cl)]

40 grams of F-127 were dried under vacuum at 100° C. for 3 hours and then 1.11 gram caprolactone and 0.16 gram catalyst (stannous 2-ethyl hexanoate) (0.39%) were added to the dry F-127. The reaction was carried out in a sealed flask, under dry nitrogen saturated atmosphere, for three hours at 145° C. The product is a water soluble, brittle, white solid, with a melting endotherm of approximately 54° C.

Example 12

Synthesis of Poly [(Cl)-F127-(Cl)]-HDI 20.6 grams of [(Cl)-F127-(Cl)], obtained in Example 11, were dried in a three-necked flask under vacuum at 100° C., for 3 hours. Thereafter, –0.31 gram Hexamethylene Diisocyanate (HDI) and 0.16 gram catalyst (stannous 2-ethyl hexanoate) (0.76%) were reacted with [(Cl)-F127-(Cl)] for 15 minutes, under mechanical stirring and a dry nitrogen atmosphere, at 80° C.

The product is a water soluble, white solid, with a Tg around –61° C. and a melting endotherm at 53° C.

It is to be understood that the examples and embodiments described hereinabove are for the purposes of providing a description of the present invention by way of example and are not to be viewed as limiting the present invention in any way. Various modifications or changes that may be made to that described hereinabove by those of ordinary skill in the art are also contemplated by the present invention and are to be included within the spirit and purview of this application and the following claims.

What is claimed is:

1. A polymeric composition exhibiting reverse thermal gellation properties comprising polymers according to the structure:

$\{[A_n(BCB)A_n]\}_m$ where A is a polyester unit, B is a poly(ethylene oxide) unit, C is a poly(propylene oxide) unit, E is a chain extender unit, n ranges from 0 to 20 and m is greater than 2, said polymeric composition having a EO/PO ratio ranging from about 0.2:1 to about 40:1, said composition having a final viscosity at a final temperature which is more than twice the initial viscosity of the composition at an initial temperature, said final temperature being at least 10° C. higher than said initial temperature.

2. The composition according to claim 1 wherein said polyester unit is derived from the polymerization of monomers selected from the group consisting of lactic acid, lactide, glycolic acid, glycolide, β-propiolactone, ε-caprolactone, δ-glutarolactone, δ-valerolactone, β-butyrolactone, pivalolactone, α,α-diethylpropiolactone, ethylene carbonate, trimethylene carbonate, γ-butyrolactone, p-dioxanone, 1,4-dioxepan-2-one, 3-methyl-1,4-dioxane-2,5-dione, 3,3,-dimethyl-1-4-dioxane-2,5-dione, cyclic esters of α-hydroxybutyric acid, α-hydroxyvaleric acid, α-hydroxyisovaleric acid, α-hydroxycaproic acid, α-hydroxy-α-ethylbutyric acid, α-hydroxyisocaproic acid, α-hydroxy-α-methyl valeric acid, α-hydroxyheptanoic acid, α-hydroxystearic acid, α-hydroxylignoceric acid, salicylic acid and mixtures, thereof.

3. The composition according to claim 1 wherein said polyester unit is biodegradable or biocrodible.

4. The composition according to claim 1 wherein said polyester comprises poly(aliphatic hydroxy carboxylic acid).

5. The composition according to claim 1 wherein said polyester comprises poly(aliphatic α-hydroxy carboxylic acid).

6. The composition according to claim 1 wherein said polyester is obtained from polymerization of a lactone selected from the group consisting of lactide, glycolide, caprolactone and mixtures, thereof.

7. The composition according to claim 1 wherein said EO/PO ratio ranges from about 7.5:1 to about 1:1 and said BCB block has a molecular weight ranging from about 1,000 to about 25,000 dalton units, said composition having a final viscosity at approximately physiological temperature which is more than 10 times the initial viscosity of the composition at ambient temperature.

8. The composition according to claim 1 which is non-biodegradable.

9. A polymeric composition exhibiting reverse thermal gellation properties comprising a crosslinked polymeric composition which is formed by reacting a polymer $A_n(BCB)A_n$ with a crosslinking agent where A is a polyester unit, B is a poly(ethylene oxide) unit, C is a poly(propylene oxide) unit and n ranges from 0 to 20, said polymeric composition comprising at least 3 $A_n(BCB)A_n$ units, said composition having a EO/PO ratio ranging from about 0.2 to about 40 and exhibiting a final viscosity at a final temperature which is more than twice the initial viscosity of the composition at an initial temperature, said final temperature being at least 10° C. higher than said initial temperature.

10. The composition according to claim 9 wherein said polyester unit is derived from the polymerization of monomers selected from the group consisting of lactic acid, lactide, glycolic acid, glycolide, β-propiolactone, ε-caprolactone, δ-glutarolactone, δ-valerolactone, β-butyrolactone, pivalolactone, α,α-diethylpropiolactone, ethylene carbonate, trimethylene carbonate, γ-butyrolactone, p-dioxanoiie, 1,4-dioxepan-2-one, 3-methyl-1,4-dioxane-2,5-dione, 3,3,-dimethyl-1-4-dioxane-2,5-dione, cyclic esters of α-hydroxybutyric acid, α-hydroxyvaleric acid, α-hydroxyisovaleric acid, α-hydroxycaproic acid, α-hydroxy-α-ethylbutyric acid, α-hydroxyisocaproic acid, α-hydroxy-α-methyl valeric acid, Δ-hydroxyhcptanoic acid, α-hydroxystearic acid, α-hydroxylignoceric acid, salicylic acid and mixtures, thereof.

11. The composition according to claim 9 wherein said polyester unit is biodegradable or bioerodible.

12. The composition according to claim 9 wherein said polyester comprises poly(aliphatic hydroxy carboxylic acid).

13. The composition according to claim 9 wherein said polyester comprises poly(aliphatic α-hydroxy carboxylic acid).

14. The composition according to claim 9 wherein said polyester is obtained from polymerization of a lactone selected from the group consisting of lactide, glycolide, caprolactone and mixtures, thereof.

15. The composition according to claim 9 wherein said EO/PO ratio ranges from about 7.5:1 to about 1:1 and said BCB block has a molecular weight ranging from about 1,000 to about 25,000 dalton units, said composition having a final viscosity at approximately physiological temperature which is more than 10 times the initial viscosity of the composition at ambient temperature.

16. The composition according to claim 9 which is non-biodegradable.

* * * * *